F. B. PARKS.
CHAIN CONSTRUCTION.
APPLICATION FILED FEB. 16, 1911.

1,170,780.

Patented Feb. 8, 1916.

Inventor

Fred B. Parks

Witnesses

By

Attorney

THE COLUMBIA PLANOGRAPH CO., WASHINGTON, D. C.

UNITED STATES PATENT OFFICE.

FRED B. PARKS, OF GRAND RAPIDS, MICHIGAN.

CHAIN CONSTRUCTION.

1,170,780.  Specification of Letters Patent.  Patented Feb. 8, 1916.

Application filed February 16, 1911. Serial No. 609,070.

*To all whom it may concern:*

Be it known that I, FRED B. PARKS, a citizen of the United States, residing at Grand Rapids, in the county of Kent and State of Michigan, have invented certain new and useful Improvements in Chain Construction, of which the following is a specification.

My invention relates to improvements in the construction of chain links and kindred articles; and its objects are: first, to provide a light chain of great durability; second, to provide a means whereby a chain made of a series of single bar links may be so riveted together that the chain will be flexible and at the same time much stronger than the plain riveting would be, and third, to provide a chain of the class mentioned that may be made flexible in two or more directions. I attain these objects by the structure illustrated in the accompanying drawing, in which—

Figure 1:
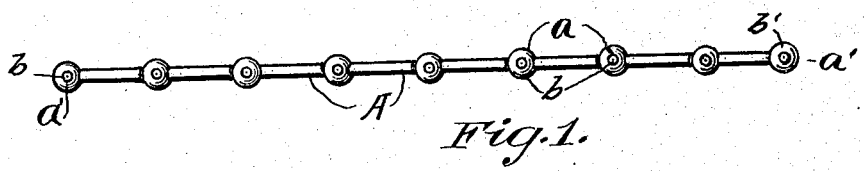
Figure 2:
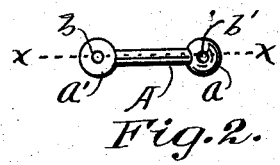
Figure 3:
Figure 4:
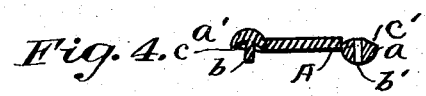
Figure 5:
Figure 6:
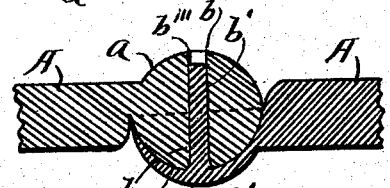

Figure 1 is a plan of a chain consisting of several links properly connected for flexibility upon but one plane. Fig. 2 is a plan of a single detached link. Fig. 3 is an edge view of the same. Fig. 4 is a sectional view of the same on the line $x\ x$ of Fig. 2. Fig. 5 is a plan of a chain of several links so arranged that alternate links may be moved at right angles with each other. Fig. 6 is a sectional view of two links as assembled.

Similar letters refer to similar parts throughout the several views.

In the construction of this chain I form links with a connecting neck, as A, and a half globe formed at each end thereof, as indicated at $a$, $a'$. The half globe $a$ has the plain surface made in conical form, as at $c'$, and a hole $b'$ through it, and the half globe $a'$ is concaved, as at $c$, to receive the cone $c'$ on the other half of the globe so that when the half globe $a'$ of one link is placed upon or connected with the half globe $a$ of another link the pin $b$ on the half globe $a'$ will pass through the hole $b'$ in the other half globe, and the cone $c'$ will engage perfectly with the concave $c$ in the other half globe and with the rivet $b$ properly headed down near the outer surface of the half globe $a$ the two links will be so connected that the strength of the completed chain will be much greater than if the connecting elements or half globe portions of the links were made with the adjacent surfaces plain and only the strength of the pins depended upon as the engagement of the conical portion $c'$ with the concave $c$ in the opposite link, together with the pivot fastening with the pin $b$ greatly increases the efficiency of the pin connection. When it is desired to construct a chain that is flexible upon a single plane only, I form the half globes upon directly opposite sides of the arm, as shown in Figs. 1, 2, 3 and 4, but when it is desired that the chain should be flexible in two or more planes, as for instance, if the chain should require to be made so that alternate links will be made flexible at right angles with each other I form the half globes at right angles upon each link, as indicated in Fig. 5, though the connection of the half globes is made the same in both instances. In constructing these links the pin $b$ is an integral part of the half globe from which it projects, or in other words the link may first be made with a full globe at each end and as one half of said globes are being milled off to form the half globes the milling tools should be formed in pairs, one of which is adapted to form the projecting pin $b$ and the concave $c$ in the half globe, while the other tool should be provided with a drill to form the hole $b'$ and the conical portion, $c'$, at the same operation. In this way the pin is made integral with the half globe, and the matchings are made perfect in all respects. The length of the bar in this construction is not material to my invention, thus, for instance, the bars A may be long or short ranging from a length where the half globes will be practically touching to any desired length, as the spirit of my invention lies in the peculiar manner of connecting the several links and not in the peculiar form or length of the connecting bar.

In Fig. 6 I have shown an enlarged sectional view of the adjacent ends of two links as they are connected when properly assembled. This view shows the outer end of the hole $b'$ slightly enlarged or countersunk as at $b'''$, so the end of the pin $b$ may be headed in, as at $b''$. This is necessary as the pin, made integral with the portion $a'$, would not, otherwise, be long enough to pass through the portion $a$ and head in securely. It will be readily seen that with this construction the drawing or lifting qualities of the connecting points of the links are greatly increased over what they would be if only the strength of the pin was depended upon, and it will be further seen that with the pin $b$ integral with the portion $a'$ the danger of the pin becoming loose and thus greatly weakening or perhaps wholly destroying the union of parts here is reduced to the minimum.

The construction shown in Fig. 6 cannot be said to consist of two half globes as the concavity of the part $a'$ and the convexity of the corresponding face of the part $a$ renders the construction more in the nature of a ball and socket joint, but is the same in nature, though greater in degree, as the construction shown and described throughout the balance of the drawing and in the specification, and fully covered in the following claims.

What I claim as new, and desire to secure by Letters Patent of the United States, is:

1. A chain composed of links each made of a single bar having a half globe at each end, one of said half globes having a hole concentrically located through it, a pin integral with and projecting from the surface of the other half globe in position so that the pin on each link may be passed through the hole in the half globe on the adjacent link to interlock the links.

2. A chain composed of a series of links each made of a single bar, a half globe formed on each end of each bar, one of said halves having a hole centrally located through it with the meeting surface of the half-globe projecting outward in conical form, the other of said half globes being made concave on the meeting surface, a pin integral and concentric with said half globe and projecting outward therefrom in position to pass through the hole in the adjacent half globe in the chain and be riveted therein to form flexible chain construction.

3. A chain composed of links each having a half globe on one end with a depression in the meeting surface and a pin concentric therewith and projecting outward therefrom, a half globe at the other end having a protrusion from the meeting surface and a hole concentric therewith through the half globe, said half globes, pins and holes made to register to form a flexible joint between links.

Signed at Grand Rapids Michigan February 11, 1911.

FRED B. PARKS.

In presence of—
I. J. CILLEY,
CHAS. V. HILDING.

Copies of this patent may be obtained for five cents each, by addressing the "Commissioner of Patents, Washington, D. C."